United States Patent
Bardin

(10) Patent No.: US 11,760,134 B2
(45) Date of Patent: Sep. 19, 2023

(54) TREAD FOR A HEAVY-DUTY VEHICLE TIRE

(71) Applicant: COMPAGNIE GENERALE DES ETABLISSEMENTS MICHELIN, Clermont-Ferrand (FR)

(72) Inventor: Damien Bardin, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 184 days.

(21) Appl. No.: 16/757,728

(22) PCT Filed: Oct. 31, 2018

(86) PCT No.: PCT/FR2018/052701
§ 371 (c)(1),
(2) Date: Apr. 20, 2020

(87) PCT Pub. No.: WO2019/086809
PCT Pub. Date: May 9, 2019

(65) Prior Publication Data
US 2021/0188011 A1 Jun. 24, 2021

(30) Foreign Application Priority Data
Oct. 31, 2017 (FR) ...................... 17/60285

(51) Int. Cl.
*B60C 11/03* (2006.01)
*B60C 11/13* (2006.01)
*B60C 11/12* (2006.01)

(52) U.S. Cl.
CPC ........ *B60C 11/0323* (2013.01); *B60C 11/125* (2013.01); *B60C 11/1369* (2013.01); *B60C 2011/1338* (2013.01)

(58) Field of Classification Search
CPC ......... B60C 11/0323; B60C 2011/1338; B60C 11/1307; B60C 11/1323; B60C 11/1281;
(Continued)

(56) References Cited

U.S. PATENT DOCUMENTS

2010/0084062 A1* 4/2010 Miyazaki ............ B60C 11/1281
152/209.18
2012/0145294 A1* 6/2012 Takemoto ........... B60C 11/0306
152/209.18
(Continued)

FOREIGN PATENT DOCUMENTS

EP  2 323 858  9/2008
EP  1974957 A1 * 10/2008 .............. B60C 11/11
(Continued)

OTHER PUBLICATIONS

Heinhaupt, English Machine Translation of WO 2016/110348, 2016 (Year: 2016).*
(Continued)

*Primary Examiner* — Justin R Fischer
*Assistant Examiner* — Brendon Charles Darby
(74) *Attorney, Agent, or Firm* — Cozen O'Connor

(57) ABSTRACT

Tread (1) for a heavy-duty vehicle tire having, when new, a tread surface (10), with at least one evolving cut (2) comprising a part (22) hidden inside the tread which is delimited by opposing walls (221, 222) distant from one another by a maximum width Lc. The part (22) being extended towards the tread surface (10) by a sipe (21), opening into the hidden part (22) to be offset from one of the walls (221, 222) delimiting the hidden part to form a bridge situated radially over said hidden part (22). The tread having a plurality of grooves (4) open when new onto the tread surface (10), these grooves (4) opening into an evolving cut (2) to form a connecting region (41), the tread (1) further comprising, in
(Continued)

at least 50% of the connecting regions (41, 42), a protuberance (5) extending over the entire height Hc of the hidden part (22) and over a maximum thickness Ep so as to act as a support for the bridge (211) situated radially over the hidden part (22) in the connecting region (41).

10 Claims, 3 Drawing Sheets

(58) Field of Classification Search
CPC .......... B60C 11/1369; B60C 11/0306; B60C 2011/0348; B60C 11/1236; B60C 11/0304
See application file for complete search history.

(56) References Cited

U.S. PATENT DOCUMENTS

| | | | |
|---|---|---|---|
| 2012/0227883 A1* | 9/2012 | Audigier | B60C 11/0323 152/209.18 |
| 2014/0130950 A1* | 5/2014 | Guichon | B60C 11/13 152/209.18 |
| 2015/0231928 A1* | 8/2015 | Sato | B60C 11/0304 152/209.18 |

FOREIGN PATENT DOCUMENTS

| | | | | |
|---|---|---|---|---|
| EP | 2 483 087 | | 9/2010 | |
| FR | 2 995 253 | | 3/2014 | |
| JP | 2008-260438 | | 10/2008 | |
| WO | WO-2016110348 A1 | * | 7/2016 | ......... B60C 11/1369 |
| WO | WO 2017/103461 | | 6/2017 | |

OTHER PUBLICATIONS

Kuhn, English Machine Translation of EP 1974957, 2008 (Year: 2008).*

* cited by examiner

TREAD FOR A HEAVY-DUTY VEHICLE TIRE

RELATED APPLICATIONS

This is a U.S. National Phase Application under 35 USC 371 of International Application PCT/FR2018/052701 filed on Oct. 31, 2018.

This application claims the priority of French application no. 17/60285 filed Oct. 31, 2017, the entire content of which is hereby incorporated by reference.

FIELD OF THE INVENTION

The invention relates to treads for tires and more particularly to the tread pattern designs of these treads, and to the tires provided with such treads which have a lasting ability to drain away water present on the roadway in times of wet weather, these treads having improved performance in terms of running and in terms of their ability to withstand external attack.

DISCUSSION OF RELATED ART

As is known, wet-weather driving conditions require the most rapid possible elimination of the water between the tread of each tire and the roadway so as to ensure that the tread makes contact with the roadway. Water that is not pushed over the front of the tire flows partially along the grooves and sipes formed in the tire tread, whether these grooves and sipes are oriented in the circumferential direction or the transverse direction or else in an oblique direction that is somewhere between the previous two directions.

Definitions

A cut means any cavity or void made notably by moulding in a tread, this cut extending both in a main direction, which is the direction of flow of the water in the cut in wet weather, and into the depth of the tread.

An open groove means a cut that opens onto a tread surface intended to be in contact with the roadway, this cut having a mean width that is such that the walls of material delimiting it are never in contact with one another under the normal conditions of use of the tire.

A sipe means here a thin cut having a mean width that is small and such that, under the normal conditions of use of the tire, the walls of material delimiting it can come at least partially into contact with one another when that sipe is in the contact patch in which the tire is in contact with the roadway.

A hidden part means a cavity or channel formed at least partially under the tread surface when new, this cavity or channel being intended to form a new groove that opens onto the tread surface after a predetermined amount of partial wear. A hidden part is delimited by two opposite lateral walls, these two lateral walls being connected to one another by a lower part forming a bottom connecting the two walls radially towards the inside and by an upper part in the continuation of these walls radially towards the outside. A sipe may open into this upper part to connect the hidden part to the tread surface when new. Viewed in cross section, a hidden part may adopt any geometrical shape, notably circular, rectangular, etc.

What is meant by the thickness of tread material to be worn away is the thickness of tread material that can be worn away during running before the legal tread wear limit, which can be identified by tread-wear indicators formed notably in the grooves, is reached.

In the present description, the terms radial or radially are used to indicate a direction which, when considered on the tire, is a direction perpendicular to the axis of rotation of the tire whereas, when considered on a tread alone, it corresponds to the direction of the thickness of said tread.

Moreover, the term circumferential is used to indicate a direction which corresponds to a direction tangential to any circle centred on the axis of rotation of the tire. This circumferential direction corresponds to the longitudinal direction of the tread, the latter being formed in the manner of a flat strip before it is incorporated into the manufacture of a new tire or into the recapping of a worn tire.

Whatever the category of tire (that is to say whether it is a tire to be fitted to a passenger vehicle or to a heavy-duty vehicle intended to carry heavy loads), the tread needs to have a standing-water drainage performance that always remains above a minimum performance referred to as the safe performance. Accordingly, and given that the tread gradually wears away, progressively reducing the cross-sectional areas of the grooves and consequently the ability of these grooves to remove a volume of liquid, it is commonplace to produce grooves that open onto the tread surface when new and continue into the thickness of the tread down to at least a level that corresponds to a legal tread wear limit requiring the tread to be withdrawn.

The disadvantage of creating a plurality of grooves that open onto the tread surface of a tread is that it reduces the amount of material for a given width of tread and consequently appreciably reduces the stiffness of the tread, this having an impact on the wearing performance. As a result, in order to address the demands experienced by the tread during running, a person skilled in the art needs to compensate for these reductions in stiffness by any means at their disposal, notably by adapting the internal structure of the tire, something that is, of course, not without impact on the cost price of the tire itself. These reductions in stiffness can also adversely affect the wear rate, the evenness of this wear, and some of the expected aspects of performance during running.

Furthermore, an increase in the rolling resistance is observed and this is connected with a greater deformability of the tread, which manifests itself in an appreciable increase in the fuel consumption of the vehicles fitted with such tires.

Document EP2483087-B1 proposes forming in a tread grooves that have the particular feature of opening discontinuously onto the tread surface when new. This type of groove can be referred to as being a wavy groove, namely one that has a geometry that is wavy in the thickness of the tread, while opening regularly onto the tread surface. This groove that is wavy in the direction of the thickness of a tread can be formed either in the circumferential direction or in any other direction. As described in document EP2483087-B1, a wavy groove is continuous in the initial state (which corresponds to the tread when new) so that, when driving on a roadway covered in standing water, water can be picked up in those parts of the groove that open onto the tread surface as they enter the contact patch, the water thus picked up circulating along the wavy groove partially beneath the tread surface. The liquid thus picked up is then ejected outside the contact patch under the effect of centrifugal forces. That same document describes the possibility, after the manner of tread pattern designs of the prior art, of making connections between at least two wavy grooves of this type in order to form a kind of drainage network.

There are other documents, notably such as WO2017103461 A1, JP2008260438 A, FR2995253 A1 or EP 2323858 B1, which recommend the formation of hidden voids formed entirely beneath the tread surface of the tread when new, these hidden voids being extended towards the tread surface by a sipe that may have a planar or wavy geometry. With this type of tire it is possible to renew a greater or lesser proportion of the initial drainage volume once the tread has reached a predetermined level of wear.

With certain tires, a combination of grooves open to the tread surface when new and of grooves comprising at least one part hidden inside the tread have been created, this at least one hidden part being extended towards the tread surface by a sipe. When a groove open to the tread surface when new is connected in a connecting region to a hidden part of at least one groove comprising hidden parts, uneven wear, namely wear localized to this connecting region, has been observed. This uneven wear may cause the tire to be withdrawn from service prematurely.

SUMMARY OF THE INVENTION

The present invention seeks to propose a solution to this problem of uneven wear that may arise before a new groove has been formed by the opening-up of a part of groove hidden beneath the tread surface of a new tread.

To this end, one object of the invention is a tread for a heavy-duty vehicle tire having a total thickness Eb corresponding to the thickness of material to be worn away during running. This tread has, when new, a tread surface intended to come into contact with a roadway when a tire provided with this tread is running. This tread surface changes with the wear generated by running.

The tread according to an embodiment of the invention comprises at least one evolving cut of maximum depth Pc at least equal to the thickness of material to be worn away, this evolving cut comprising at least one part hidden inside the tread, this hidden part, of maximum width Lc and of height Hc, being extended towards the tread surface by a sipe opening onto this tread surface. The hidden part is delimited by opposing walls distant from one another by a maximum width Lc, these walls extending towards the tread surface thereby delimiting a sipe of a suitable width for creating at least partial contact between said walls as they enter the contact patch in contact with the roadway. The aforementioned sipe may adopt any suitable geometric shape, and may notably exhibit zigzags or waviness in its depth. This sipe opens into the hidden part in such a way as to be offset from one of the opposing walls delimiting the hidden part in order thus to form at least one bridge of material radially over said hidden part.

This tread further comprises a plurality of grooves open when new onto the tread surface of the tread, these open grooves having, when new, a depth Pg and a mean width Lg on the tread surface. These grooves that are open when new comprise two ends and open at least at one of their ends into an evolving cut, which is to say both into the hidden part of the evolving cut and into the sipe that extends this hidden part to form a connecting region.

An embodiment of the invention is characterized by the presence of a protuberance formed locally, namely in the connecting region, on the wall of the hidden part of the evolving cut, this protuberance extending over the entire height Hc of the hidden part and over a total length Lp measured in the main direction of the hidden part and a maximum thickness Ep so as to act as a support for the bridge of material situated radially over the hidden part in the connecting region while at the same time maintaining an opening of non-zero cross section onto the hidden part.

For preference, the maximum thickness Ep of the protuberance is at least equal to 75% of the width of the bridge of material situated radially over the hidden part in the connecting region. More preferably still, this maximum thickness is equal to the width of said bridge of material.

For preference, the protuberance has a transverse cross section that is such that the opening onto the hidden part is at least equal to 20% of the cross-sectional area of the hidden part. The opening onto the hidden part corresponds to the section of the hidden part that is connected to the open groove in the connecting region. If the protuberance occupies the entirety of the transverse cross section of the hidden part, there is no longer any possibility for fluid to flow between the groove and the hidden part of an evolving cut.

By virtue of this means it is possible to maintain a sufficient opening of the hidden part on each side of the protuberance so as to allow fluids to flow in this hidden part and in the groove open onto the tread surface when new. Furthermore, the presence of this protuberance generates mechanical reinforcement/support for the material present between the tread surface and the hidden part in the region of connection between the groove open onto the tread surface and the evolving cut.

By virtue of embodiments of the invention, it is possible very locally to increase the stiffness of the tread in the vicinity of each hidden part in a phase of wear fairly close to the formation of a new groove open onto the tread surface. This local modification of stiffness ensures better wearing behaviour and it is thus possible to obtain a more even profile for the wearing of the tread before a new groove appears, compared with a tread without protuberances as defined.

In one variant of the invention, each protuberance comprises lateral parts extending on each side of the connecting region to form parts of variable thickness so as to limit the disruption to flow in the hidden part of the evolving cut.

In another variant of the invention, a bridge of material is formed in the groove open onto the tread surface, this bridge of material having a height comprised between 30% and 70% of the depth Pg of the groove and a length Lp measured in the direction of the open groove which is at most equal to 75% of the length of said groove.

This bridge of material generates additional stiffness in a region close to the region of connection between the groove and the evolving cut. It is thus possible to even out the stiffnesses in the tread. Advantageously, a sipe may cut the bridge of material into two parts.

In another variant of the invention, a sipe may be formed in the continuation of the groove, connecting with an evolving cut, this sipe opening onto the tread surface when new and being able to extend as far as the protuberance formed in the connecting region.

This same principle of invention may be applied to an evolving cut of which the hidden part is wavy in the direction of the thickness of the tread, after the manner of the cut described in document EP2483087-B1.

Further features and advantages of the invention will become apparent from the following description provided with reference to the appended drawings which show, by way of non-limiting example, embodiments of the subject matter of the invention.

DETAILED DESCRIPTION OF THE FIGURES

Figure 1:
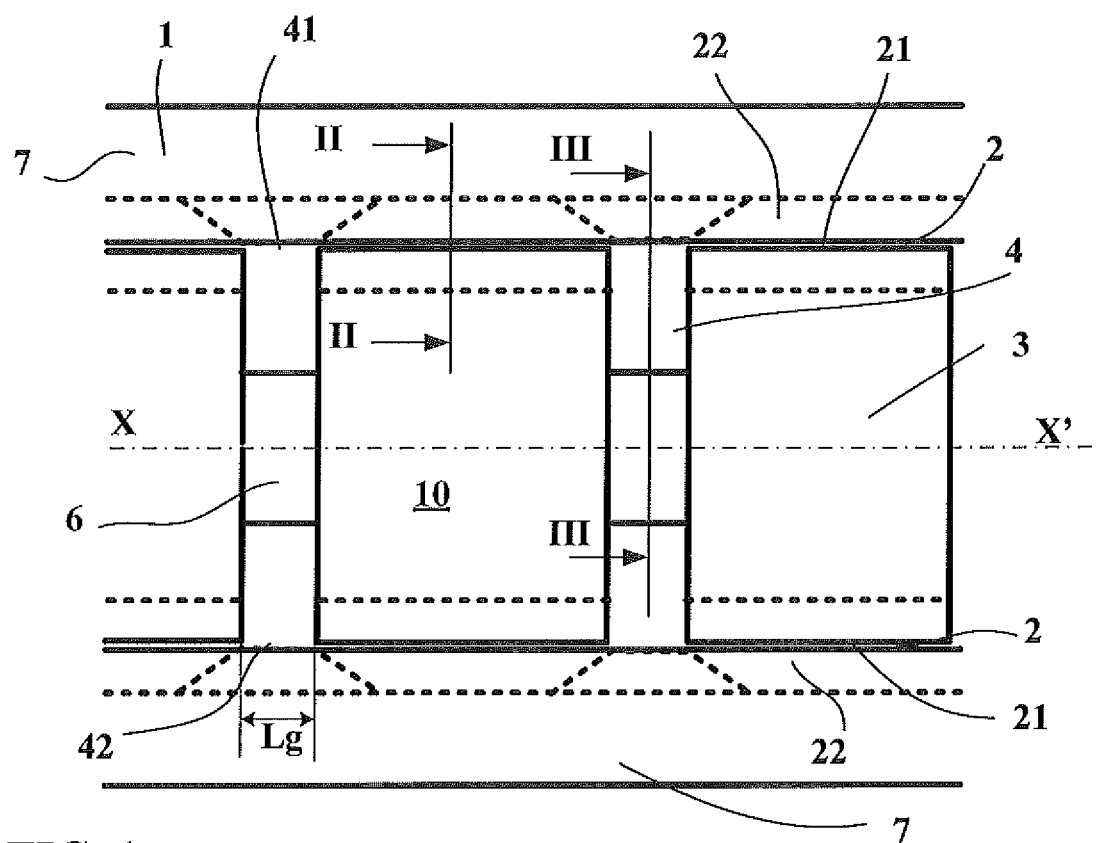
FIG. 1 shows an overview of the exterior surface of a first variant of a tread when new according to an embodiment of the invention.

The first variant illustrating the invention relates to a tread 1 of a tire of size 11 R 22.5 to equip a heavy-duty vehicle. This tread 1 comprises, as can be seen in FIG. 1, a tread surface 10 intended to come into contact with the roadway during running.

This tread 1 comprises two evolving cuts 2 of circumferential direction opening onto the tread surface when new via sipes 21 of a width that is suitable for their opposing walls to come into at least partial contact when they enter the contact patch in which the tire is in contact with the roadway. The mean width of these sipes 21 on the tread surface 10 when new is, in this instance, equal to 1 mm. These two evolving cuts 2 between them delimit a central region 3 extending on each side of the midplane of the tread, the line of which is indicated by the direction XX' in FIG. 1. On each side of this central region 3 there are formed circumferential ribs 7 that axially delimit the tread 1.

Each evolving cut 2 has a maximum depth Pc equal to 19 mm and comprises a hidden part 22 forming a channel that is completely hidden beneath the tread surface when new 10. Each hidden channel 22 is intended to form a new groove open onto the tread surface of the tread after a predetermined amount of partial wear.

Figure 2:
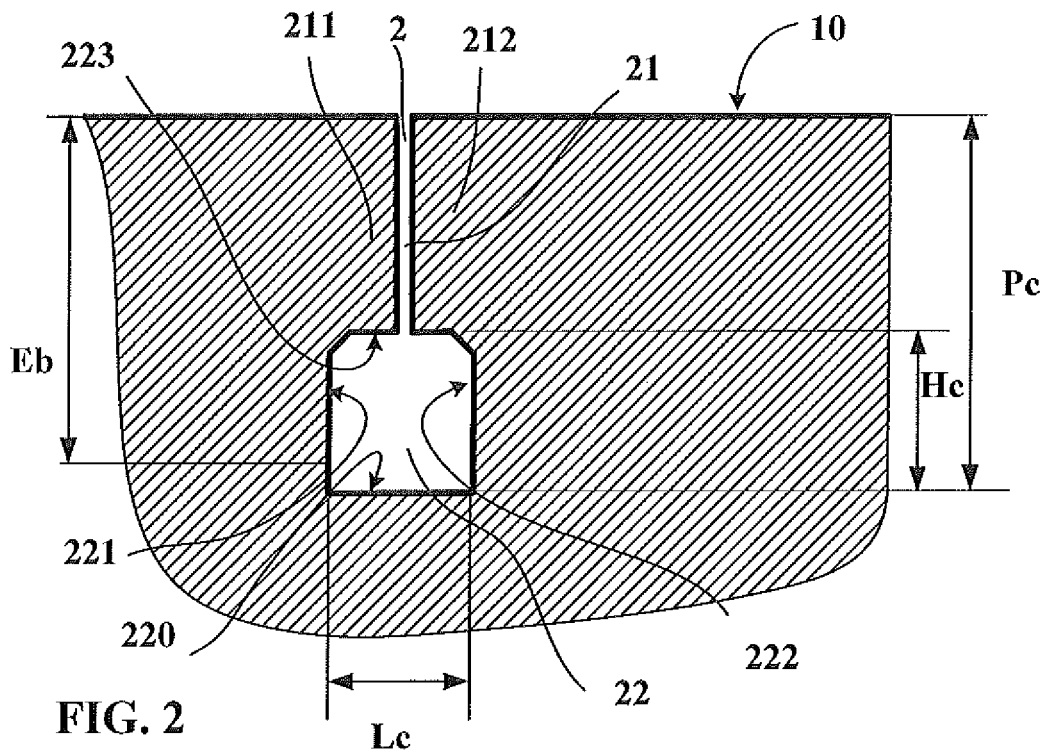
FIG. 2 shows a partial cross section on a plane of section of which the line is depicted as II-II in FIG. 1.

In this instance, and as can be seen in FIG. 2 which shows a transverse cross section on a plane of which the line in FIG. 1 is indicated by II-II, the hidden part 22 is of substantially rectangular cross section with a height Hc (here equal to 7 mm) and a maximum width Lc (here equal to 4.5 mm). This hidden part 22 comprises two opposing walls 221, 222, these walls being connected by a bottom 220 radially on the inside and by a top 223 radially on the outside. In the instance described, the sipe 21 cuts the top 223 of the hidden part 22 into two parts of equal width. It can be discerned that there are formed, on either side of the sipe 21, bridges of material 211, 212, each bridge of material coming into contact with the opposing bridge of material as the sipe 21 closes as it enters the contact patch in which it is in contact with the roadway.

Furthermore, FIG. 1 shows that the tread comprises a plurality of open grooves 4 on the tread surface when new 10, these open grooves 4 being oriented transversely, namely parallel to the axial direction of the tire (perpendicular to the direction identified by the axis XX' in FIG. 1). Each transverse open groove 4 has a width Lg on the tread surface when new 10 equal to 12 mm, and a depth Pg equal to 19 mm.

Each one of these transverse open grooves 4 ends at the evolving cuts 2 at its two ends to form two connecting regions 41, 42. These connecting regions 41, 42 allow a circulation of fluid inside the transverse open grooves 4 and inside the hidden parts 22 of the evolving cuts.

Figure 3:
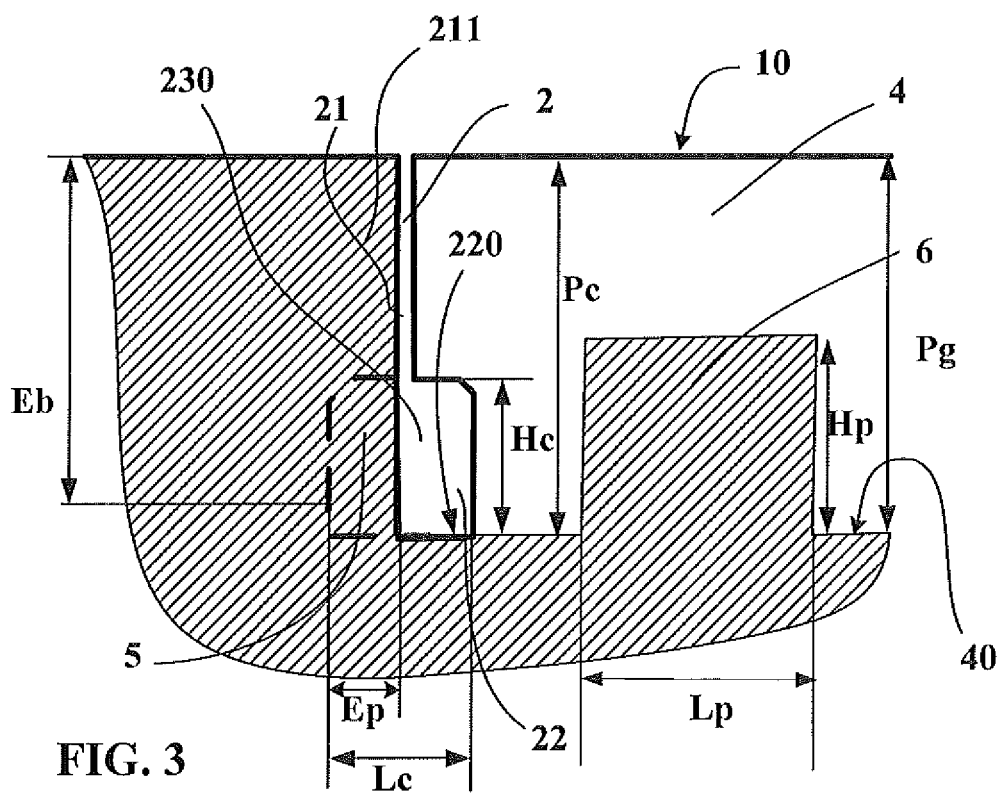
FIG. 3 shows a partial cross section on a plane of section of which the line is depicted as III-III in FIG. 1.

FIG. 3 shows, in a plane of section the line of which is identified by III-III in FIG. 1, the presence, in each connecting region, of a protuberance 5 formed on the lateral wall 221 of the hidden part 22 (the other wall 222 having been eliminated locally by the presence of the transverse groove 4). In the case described, this protuberance 5 occupies the entirety of the width of the bridge of material 211 still present (the other bridge of material having been eliminated by the presence of the transverse groove 4) and has a thickness Ep that is constant over its entire height. Thus, an opening 230 onto the hidden part 22 is maintained, placing the transverse open groove 4 and said hidden part 22 in communication.

In this way, this protuberance 5, without completely closing the hidden part 22, offers mechanical support to the bridge of material 211 that there is between the hidden part 22 and the tread surface 10 in the region 41 of connection between the evolving cut 2 and the transverse open groove 4.

Figure 4:
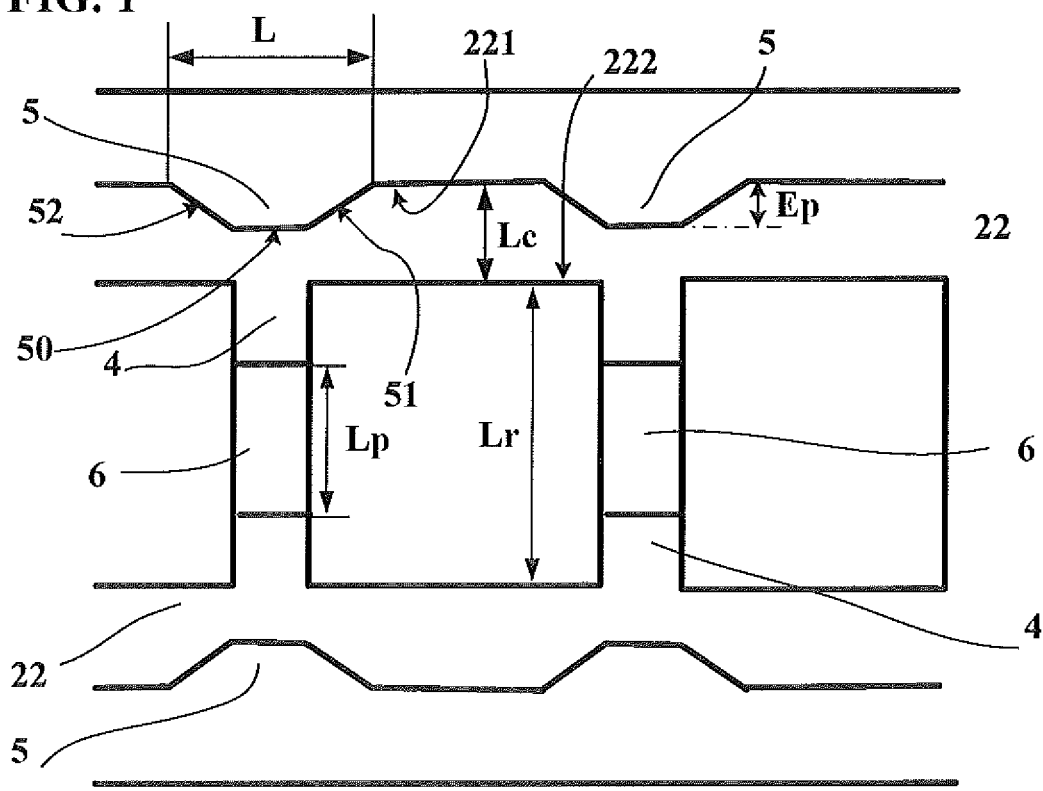
FIG. 4 shows the tread surface of the tread of the first variant after partial wear.

Studying FIG. 4, which shows a view of the tread surface after partial wear that is sufficient that the hidden parts have become open onto the tread surface and are forming new circumferential grooves, it may be seen that the protuberance 5 has a maximum thickness Ep (in this instance: 2.25 mm) equal to half the maximum width Lc of the hidden part and that it has a total length L (here equal to 11.5 mm), the latter length being measured at its base on the surface of the wall 221 of the hidden part 22. This same protuberance 5 has a front lateral face 50 occupying the entire width of the transverse groove 4 in this instance. This front lateral face 50 is extended on each side by end lateral faces 51, 52 which are inclined and connected to the wall 221 of the hidden part 22 of the evolving cut.

The numerical values are given only by way of illustration of the example described, and it is of course possible for a person skilled in the art to adapt each of these dimensions to suit the technical requirements in each specific instance.

In this first variant, there has also been provided a bridge 6 of material formed from the bottom 40 of each transverse groove 4 and rising up over a height Hp equal in the example described to 50% of the depth of the groove 4 when new (namely 9.5 mm) as can be seen notably in FIG. 3. The length Lp of this bridge of material 6, measured in the main direction of the transverse groove 4, is, in the example described, of the order of 50% of the length Lr of said transverse groove. In order to adapt the local stiffnesses, it is possible to provide this bridge of material with a sipe parallel to the walls delimiting the open groove in which the bridge is formed. This same sipe may extend into the protuberance formed in the region of connection between the open groove and the hidden part of the evolving cut.

That which has been described for one end of the transverse open groove 4 is also found at the other end.

Figure 5:
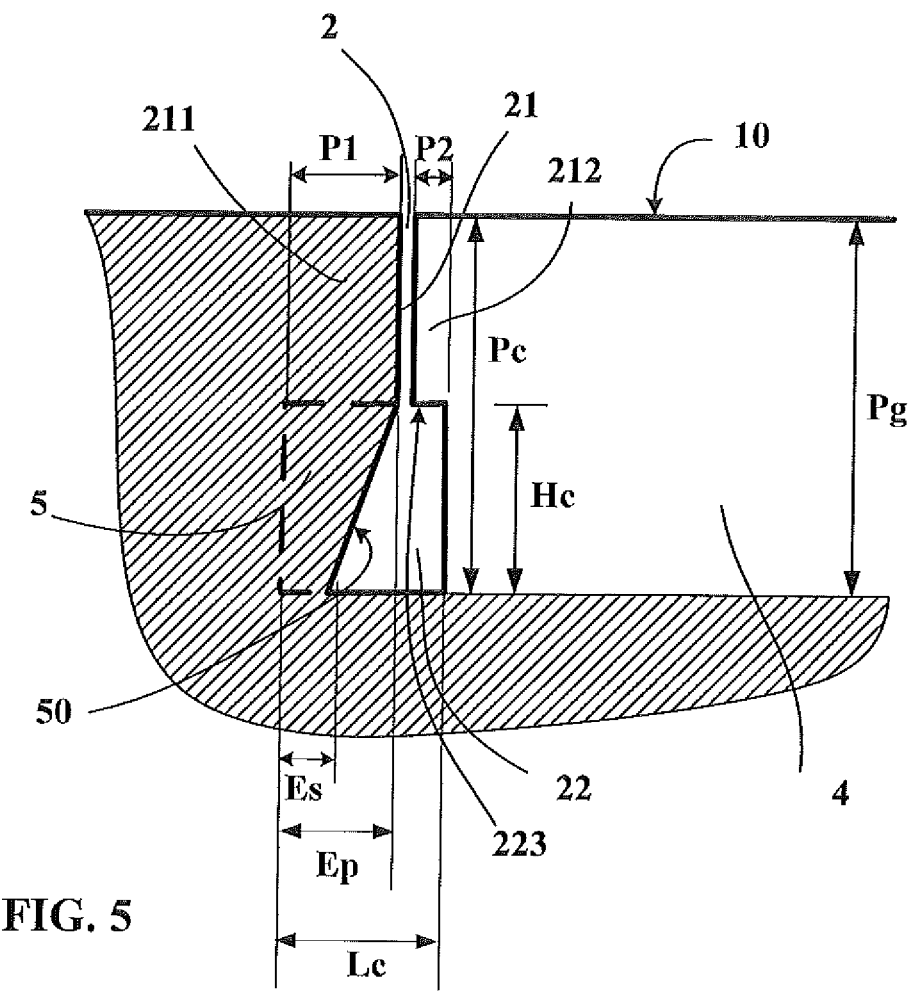
FIG. 5 shows a view in cross section of a second variant according to the invention.

A second variant is shown in FIG. 5, where the sipe 21 extending the hidden part 22 towards the tread surface 10 when new is offset on the top face 223 of said hidden part 22. In this variant, the bridges of material 211, 212 formed on each side of the sipe 21 and radially on the outside of the hidden part 22 of the evolving cut 2 do not have the same width P1, P2. In the example described, the width P1 of the bridge of material 211 which remains in the region of connection with the transverse open groove 4 is greater than the width P2 of the other bridge of material 212.

In order to enjoy sufficient mechanical support while at the same time maintaining a suitable opening onto the hidden part 22, a protuberance 5 is formed which occupies the entire width P1 of the bridge of material 211 at the top 223 of the hidden part and a width Es on the bottom of said hidden part, this width Es being substantially equal to 50% of the width P1 of the bridge of material 211. The protuberance 5 comprises a lateral face 50 facing the open groove 4 which is an undercut. The maximum width Ep of the protuberance 5 is here equal to the width P1 of the bridge 211. The lateral face 50 which here is planar and inclined may of course be adapted and adopt a convex or concave shape.

As a preference, as depicted in FIG. 1, a protuberance 5 is formed in each of the connecting regions (41, 42) of the tread. However, depending on the configuration of the tread, a certain number of connecting regions may also not be provided with such a protuberance provided that at least 50% of the connecting regions are actually provided with same.

In a variant which has not been depicted here, the protuberance may be formed in such a way as to widen in the direction towards the bottom of the hidden part; in this last variant, the risk of foreign bodies such as stones becoming caught in the hidden part is reduced.

The invention is not restricted to the two examples described and various modifications can be made thereto without departing from its scope as defined in the claims. In particular, that which has been described in respect of circumferential evolving cuts could be applied to any other orientation, and notably to a transverse or oblique orientation. Likewise, grooves which are open when new onto the tread surface could be oriented obliquely with respect to the direction of the evolving cuts.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tread of a heavy-duty vehicle tire having, when new, a tread surface which contacts a roadway during running, the tread comprising:
    at least one circumferential evolving cut of maximum depth Pc, the at least one evolving cut comprising at least one part hidden inside the tread, the hidden part having a height Hc and being delimited by opposing walls distant from one another by a maximum width Lc, the hidden part being extended towards the tread surface by a sipe opening onto said tread surface, and the sipe opening into the hidden part and being offset from one wall of the opposing walls delimiting the hidden part to form at least one bridge of material situated radially over said hidden part;
    a plurality of grooves which open onto the tread surface when new, each of the plurality of grooves being oriented transversely and having, when new, a depth Pg and a mean width Lg on the tread surface and comprising two ends, each of the plurality of grooves being oriented perpendicularly with respect to an extending direction of the at least one evolving cut with an opening at least at one respective end into the at least one evolving cut to form connecting regions; and
    a circumferential bridge of material formed in at least one groove of the plurality of grooves and open onto the tread surface, an extending direction of the circumferential bridge of material being parallel with respect to the extending direction of the at least one evolving cut;
    wherein in the tread, a protuberance is formed locally on one wall of the hidden part of the at least one evolving cut, the one wall facing to one end of one groove of the plurality of grooves connected to the at least one evolving cut, in at least 50% of the connecting regions, the protuberance extending circumferentially and having a front lateral face which is extended circumferentially on each side by lateral faces which are inclined and connected to the one wall of the hidden part, and the protuberance extending over an entirety of the height He of the hidden part and over a total length L measured in a main direction of the hidden part and over a maximum thickness Ep to form a support for the at least one bridge of material situated radially over the hidden part in a respective connecting region.

2. The tread according to claim 1, wherein said protuberance is formed in each connecting region of the tread.

3. The tread according to claim 1, wherein the maximum thickness Ep of the protuberance is at least equal to a width of the at least one bridge of material situated radially over the hidden part in the respective connecting region.

4. The tread according to claim 1, wherein the protuberance has a transverse cross section arranged such that, in a transverse cross section at a connecting region with one groove of the of the plurality of grooves, a space not occupied by the protuberance in the hidden part is at least equal to 20% of a cross-sectional area of the entire hidden part.

5. The tread according to claim 1, wherein the lateral faces extend on each side of the connecting region to form parts having variable thicknesses so as to limit a disruptive flow in the hidden part of the at least one evolving cut.

6. The tread according to claim 1, wherein the circumferential bridge of material has a height Hp comprised between 30% and 70% of the depth Pg of the at least one groove of the plurality of grooves and a length Lp measured in the direction of the at least one groove of the plurality of grooves which is at most equal to 75% of a length Lr of said open groove.

7. The tread according to claim 1, wherein the at least one evolving cut comprises a hidden part which is wavy in a direction of a thickness of the tread.

8. The tread according to claim 1, wherein for each protuberance in the hidden part on one side of the tire another protuberance is arranged symmetrically directly opposite on an opposing side of the tire.

9. The tread according to claim 1, wherein each protuberance is arranged on an axially outer wall of the at least one evolving cut and projects towards the plurality of grooves.

10. The tread according to claim 1, wherein each protuberance extends into the at least one evolving cut and projects towards the plurality of grooves.

* * * * *